July 2, 1968 R. M. IRBY, JR., ET AL 3,390,686
TOBACCO SMOKE FILTER ELEMENT
Filed Dec. 21, 1965
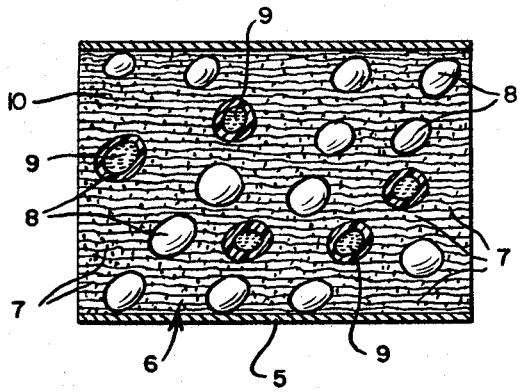
FIG. 1
FIG. 2
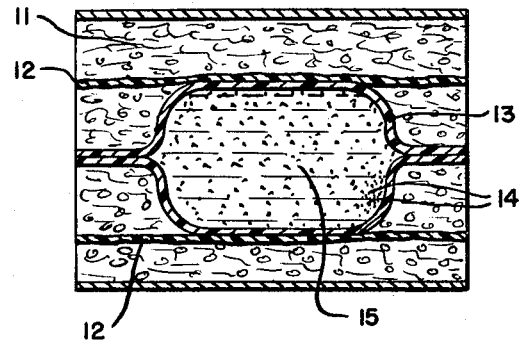
FIG. 3
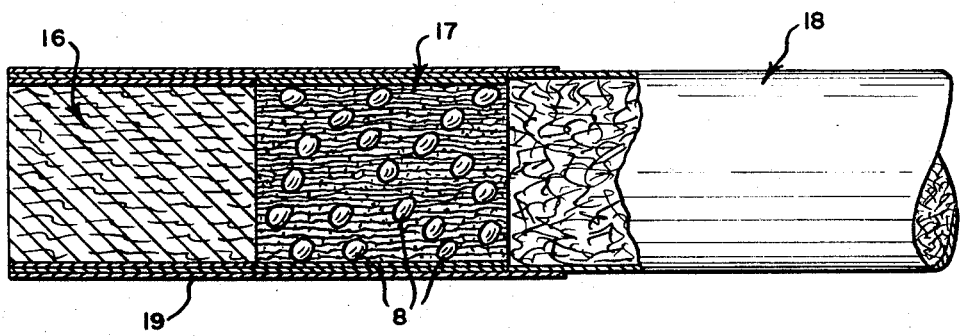
INVENTORS
RICHARD M. IRBY, JR.
ROBERT S. SPRINKLE, III
BY
ATTORNEYS United States Patent Office 3,390,686
Patented July 2, 1968

3,390,686
TOBACCO SMOKE FILTER ELEMENT
Richard M. Irby, Jr., and Robert S. Sprinkle III, Richmond, Va., assignors to The American Tobacco Company, New York, N.Y., a corporation of New Jersey
Filed Dec. 21, 1965, Ser. No. 515,313
6 Claims. (Cl. 131—266)

ABSTRACT OF THE DISCLOSURE

A tobacco smoke filler filter composed of a liquid-entraining material along with at least one frangible capsule containing a liquid smoke-treating medium and a multiplicity of liquid moisturized particles of active carbon.

---

This invention relates to tobacco smoke filters and, more particularly, to a tobacco smoke filter element that introduces a smoke-treating liquid into the path of smoke drawn through the filter element.

Numerous proposals have been made heretofore for introducing water and other liquids into a tobacco smoke filter. For example, United States Patent No. 2,808,057 discloses a fibrous filter body containing adsorbed water and enclosed in a waterproof cylindrical wrapping sheet having open ends, and United States Patents Nos. 2,755,206, 2,863,461 and 3,162,199, as well as British Patent No. 243,199, describe smoke filters containing collapsible or frangible capsules filled with water or other liquids. Filter elements containing free liquid pose a problem of retaining the liquid during storage, and those containing capsules or other containers of a smoke-treating liquid in sufficient quantity to be effective present, after release of the liquid by the user, a problem of providing enough liquid to be effective throughout the smoking period but not so much as to render the filter element soggy.

We have now devised a tobacco smoke filter element which does not contain free liquid until released by the smoker and which, after the liquid is thus released, retains its shape and functions effectively as a smoke filter without any of the aforementioned disadvantages. The novel filter element of the present invention comprises a resilient tubular outer wrapper surrounding a filler of compressible liquid-entraining material arranged to permit axial filtering flow of smoke therethrough and having disposed therein at least one frangible capsule containing a liquid smoke-treating medium, and a multiplicity of particles of active carbon moisturized with said liquid. The microcapsules are broken to release their liquid medium content into the filler when squeezing pressure is applied to the outer wrapper of the filter element, and the resiliency of the compressible filler is advantageously such as to cause the filter element to return substantially to its tubular shape when such pressure is released.

These and other novel features of the invention will be more readily understood from the following description taken in conjunction with the accompanying drawing in which FIG. 1 is a longitudinal cross-sectional view of the filter element of the invention;

FIG. 2 is a longitudinal cross-sectional view of another embodiment of the invention in a filter element; and FIG. 3 is a longitudinal cross-sectional view showing the filter element of FIG. 1 incorporated with a second conventional filter element into a dual-filter cigarette.

As shown in FIG. 1, the filter element of the invention comprises a resilient outer wrapper 5 surrounding a filler 6 of compressible material having passages 7 arranged to permit axial flow of smoke therethrough with the customary total resistance to air and smoke flow through a cigarette with the filter attached of, say, about 5 to 30 cc. per second under a suction pressure of 2⅝ inches of water. The filler further comprises at least one frangible capsule 8 containing a liquid 9, and a multiplicity of particles of active carbon 10 moisturized with said liquid.

The outer wrapper 5 can be of conventional plug wrap paper used in making cigarette filter plugs. It does not have to possess significant wet strength because the liquid in the microcapsules is not released until after the filter element is enclosed in the stronger tipping paper used to secure the filter element to a cigarette or cigar, or the like. It should, however, have sufficient body to be resilient so that it can permit the filter element to be compressed when the tube is squeezed and so that it will return substantially to its initial tubular shape when squeezing pressure is released.

The frangible capsules of liquid and the moisturized particles of active carbon play cooperating roles in the filters of the present invention. The capsules contain the liquid until the user releases it by squeezing the filter. The released liquid spreads through the filler material of the filter where it is available for contact with smoke drawn through the filter and where it is also available as a reservoir for maintaining the moisture content of the carbon particles. The moisturized carbon particles, on the other hand, effectively retain their liquid content during storage of the filter cigarette by virtue of the adsorptive power of the active carbon. When smoke is drawn through the filter, the moisturized carbon particles are present to give up their liquid to the smoke. Both the particulate phase and the vapor phase of the smoke are readily adsorbed by the moisturized carbon particles, and this adsorption evolves heat which helps to volatilize the liquid eluted from the carbon particles by preferential adsorption of some of the smoke. The thus-released vapors of the treating liquid act on the smoke in two ways: some of it is available for condensation on the particles of the particulate phase of the smoke and thus dilute it with the treating liquid, and the remainder of the volatilized liquid from the carbon enters the vapor phase of the smoke so that as the smoke passes through the liquid-impregnated filler material the smoke will not vaporize and deplete the liquid in the filler before the cigarette has been completely smoked. In between smoking puffs by the user, the liquid in the filter serves as a reservoir to restore to the carbon particles the liquid which the particles lose to the smoke by elution during each puff. Maximum advantage is thus taken of all of the liquid present in the filter without having to use such an excessive amount as to render the filter soggy when it is squeezed by the smoker.

It will be readily observed, accordingly, that there is true cooperation between the capsules of liquid and the moisturized carbon particles. Although there is an apparent need for a filler material as an essential third component, the filler material may be supplied by a sufficiently large mass of carbon particles to provide not only the necessary amount of moistured active carbon particles but also the filler material for holding or sequestering the liquid released from its capsules.

The filler material used in the filter element of the invention must be compressible and capable of entraining a significant amount of the released liquid so as to hold the liquid in the pores or passages of the filler material through and past which the smoke is to be drawn. Moreover, by entraining the released liquid, the liquid is restrained from passing into the tobacco portion of a cigarette or cigar or into the smoker's mouth, or into an adjacent section of a multiple-component filter assembly. The filler material is advantageously resilient not only when dry but also when wet with the liquid so as to permit the filter element to be compressed for the purposes of rupturing the liquid-containing capsules yet spring back substantially to its pre-compressed form in order to resume its filtering position within the filter tube. Our present preference for the filler material is conventional smoke filter paper having both good absorbency and wet strength. Paper of this type is generally of sufficient resiliency, even when wet, to satisfy the most demanding requirements of a filter element, but further resilience can be imparted to the paper by coating it with starch or other porous stiffening material. Cellulose acetate tow, cotton and cellulose sponge, all with or without a coating of stiffening material, are effective filler materials for the filter of the invention, and foamed or sponge plastic, of polyurethane or the like, also can be used advantageously as well, of course, as the aforementioned body of carbon particles.

The liquid-containing capsule positioned within the filler portion of the filter element of the invention can be a single relatively large capsule or can be a number of capsules which range in diameter between about 0.001 and 0.12 inch. The large size capsules are generally made by conventional techniques used in the pharmaceutical industry, and the miniature capsules can be made by a coacervation process or liquid-solid exchange process. Suitable micro-capsules can also be produced mechanically with a single or multiorifice encapsulating device which forces drops of a liquid to be encapsulated through a thin film of coating-forming material. Centrifugal devices can also be used in a similar fashion. Some of these and other microencapsulating procedures are described in U.S. Patents Nos. 2,800,457, 2,800,458, 2,969,330 2,969,331, 3,015,128 and 3,041,289, in an article by H. W. Mattson entitled "Miniature Capsules," published in the April 1965, issue of International Science and Technology (New York, N.Y.) pages 66 et seq., and in "Microencapsulation," a report recently published by Management Reports, Boston, Mass.

The capsules used pursuant to our invention comprise an outer frangible sheath enclosing the smoke treating liquid. The sheath advantageously is composed of a wax, such as a hard petroleum wax, or of a thermoplastic or thermosetting resin such as vinylidene chloride copolymers, polyethylene, polypropylene, ethylene-vinylacetate copolymers, polyesters, phenol-formaldehyde and urea-formaldehyde resins, or of gelatin, or the like. There is no limitation on the composition of the sheath material other than its ability to form and maintain an encapsulating but frangible sheath about the treating liquid. The liquid within the sheath can be plain water or it can be water containing a conventional surfactant to accelerate the spreading of the water throughout the filler material when the capsule is ruptured. In addition, a flavorant can be added to the water to enhance, augment, or otherwise alter the flavor or character of the tobacco smoke, or it may contain a medicament such as a decongestant, or a metal salt, such as an iron salt, can be incorporated in the aqueous medium to neutralize undesirable constituents of the tobacco smoke. Non-aqueous liquids, such as lemon oil or other flavoring oils, can also be enclosed within the sheath of the capsules.

The number of microcapsules incorporated in the filler material depends upon their size and the amount of free liquid desired in the filter. When water is used as the treating liquid, for example, we have found that 5–80 mg. of water per 10 mm. filter unit can be used effectively. A lesser amount of water outside the broad range gives less effective removal of water-soluble constituents of the vapor phase of the smoke, and greater amounts of water than covered by the aforesaid range tend to promote transfer of the water into the tobacco of the cigarette. Of course, with longer or shorter filter lengths, the preferred and broadly useful ranges of water or other liquid content per filter unit should be increased or decreased proportionately.

If more than a single capsule is used per filter element, they are advantageously disposed throughout substantially the entire length and breadth of the filler. When the capsules are to be carried by a sponge-type filler, it is presently preferred to distribute the capsules in the sponge or foam during its production. Another modification using a sponge-type filler, as shown in FIG. 2, is to compress the sponge 11 into the form of a cylinder 12 and then fill the center of this cylinder with one or more capsules 13 containing a slurry of carbon particles suspended in the treating liquid 15. When the capsules are ruptured, the released liquid causes the sponge to expand and fill the void left by the ruptured capsules. In the case of a paper filler, made by the conventional procedure of crimping, folding, or otherwise forming a mass of the paper into a smoke filter element, we have found is advantageous to apply the capsules to the surface of the paper before forming it into a filter element. Thus, by spraying the surface of the paper with an adhesive substance such, for example, as a starch solution, it has been found that the capsules adhere effectively to the paper during subsequent handling and that, furthermore, the coating material enhances the stiffness and resiliency of the paper filler with its adhering capsules. The stiffness of the paper facilitates rupturing of the microcapsules when the filter element of the invention is squeezed, and we have further found that the presence of the carbon particles contributes to the completeness with which the microcapsules are ruptured by compression of the filler material.

The carbon particles useful in the filter element of the invention may be of any active form of carbon from any source, and the term "active carbon" as used herein and in the claims is intended to include any of the known normally solid adsorbent equivalents thereof such, for example, as silica gel, zeolites, chabazites, etc. The size of the particles can range from 30% minus 325 mesh to about 20 mesh (Tyler standard), the present preference being for particles ranging between about 50 and 150 mesh size.

The carbon particles are readily moisturized by immersing them in the liquid and then drying them at ambient or elevated temperature. The choice of drying temperature depends, of course, upon the liquid, but in general it is presently preferred to dry the liquid-containing carbon particles to the moisturized state where they equilibrate closely to the conditions prevailing in the cigarette. The particles thus contain adsorbed as well as absorbed liquid, but when the particles are to be individually distributed through the filter element they should not contain so much surface liquid as to cause them to stick together. For example, in the case of active carbon particles wetted with water, the particles are advantageously air-dried until they equilibrate, for example, with an ambient atmosphere of 75° F. and about 60% relative humidity. In this condition the particles contain about 33% water on a dry carbon basis. In general, however, it is presently preferred to use moisturized carbon particles with about 40–50% water on a dry carbon basis.

The liquid-containing capsules are thus distributed throughout the filter element of the invention in such manner that rupture of the capsules releases the liquid medium to all parts of the filler material. This widespread distribution of the liquid through the filler material and its full-time availability by virtue of the effect of the moisturized carbon particles makes the benefit of the presence of the liquid medium in the filter available to all of the smoke drawn through the filter.

The following specific example is illustrative of the production of a filter element embodying the invention:

A grooved tobacco smoke filter paper marketed by Ecusta Paper Corp. under the trade name "Skyline" was fed to a filter rod making machine. This paper was chosen for its combination of resiliency, good wet strength and absorbency and the grooved feature was chosen because it provides a very porous filter plug. Prior to entering the garniture, one surface of the paper was sprayed with a starch solution. The wet starch-coated paper then passed under a shaker which deposited thereon microcapsules composed essentially of water droplets in a hard outer sheath made up of petroleum wax. The microcapsules had a diameter of about 0.07 inch, and their water content was between 50% and 60% of the total weight of the capsules. The capsule-coated paper then passed under a second shaker which deposited thereon premoistured particles (about 40% water on a dry basis) of activated charcoal having a size range of about 50 to 150 mesh (Tyler). The amount of carbon and capsules added to the paper was sufficient to provide between about 25 and 75 mg., and specifically here about 50 mg., of moisturized carbon and about 50 to 150 mg., and specifically here about 100 mg., of microcapsules per 10 mm. filter element in the finished cigarette.

The resulting coated paper was crimped and folded in a conventional garniture for converting paper into a rod of filter material. A moisture-resistant commercially available plug-wrapper paper was used to enclose the folded capsule containing paper filler in a tubular form, and the form was then cut into rod-lengths suitable for the feed to a composite filter rod making machine. In the latter machine, the filter element of the invention was combined with a cellulose acetate filter element and made into composite dual filter rods suitable for feed to a filter cigarette making machine. In the cigarette making machine, the dual filter element, comprising the cellulose acetate filter element 16 and the filter element 17 such as that shown in FIG. 1, was combined with the tobacco rod 18, as shown in FIG. 3, by means of a conventional tipping paper 19 to form a dual filter cigarette.

The resulting filter cigarette was then tested by first rolling the filter portion between the fingers with sufficient squeezing pressure to flex the tipping paper inwardly and thus rupture the frangible microcapsules in the filter element embodying the invention. The cigarette with its free-water containing filter was test smoked in a machine under standard smoking conditions used in the industry. The smoke was analyzed for vapor phase constituents and it was found that reduction in concentration of vapor constituents was about 30%, compared with smoke from the same cigarette when the filter was removed. The water containing filter element of the invention further increased the water content of the particulate phase of the smoke from a conventional 5–9% to about 20% by weight. The active carbon component of the filter of our invention was found to adsorb the constituents normally adsorbed by active carbon in a conventional filter, the adsorption of these constituents apparently eluting the adsorbed moisture and releasing this moisture to augment that adsorbed in and held by the filler material and carbon.

We claim:

1. A tobacco smoke filter element comprising a resilient tubular outer wrapper surrounding a filler of compressible liquid-entraining material arranged to permit axial filtering flow of smoke therethrough and having disposed therein at least one frangible capsule containing a liquid smoke-treating medium and a multiplicity of liquid moisturized particles of active carbon, whereby the capsule is broken to release its liquid content into the filler when squeezing pressure is applied to the outer wrapper of the filter element.

2. A tobacco smoke filter element according to claim 1 in which the liquid is water.

3. A tobacco smoke filter element according to claim 1 in which the liquid is contained in a number of capsules having a diameter within the range of about 0.001 and 0.12 inch.

4. A tobacco smoke filter element according to claim 1 in which the filler material is paper bearing on its surface (a) a plurality of microcapsules containing water and (b) the multiplicity of carbon particles, the coated paper being folded into the form of a cylindrical filter element with the microcapsules and carbon particles distributed therethrough.

5. A tobacco smoke filter element according to claim 1 in which the filler material is coated with a stiffening agent.

6. A tobacco smoke filter element according to claim 1 in which the filler comprises a cylindrical sleeve of compressed sponge material the open center of which contains at least one frangible capsule containing carbon particles suspended in the liquid smoke-treating medium.

References Cited

UNITED STATES PATENTS

| | | | |
|---|---|---|---|
| 2,755,206 | 7/1956 | Statia | 131—10.1 |
| 2,801,638 | 8/1957 | Schur et al. | 131—266 |
| 3,196,478 | 7/1965 | Baymiller et al. | |
| 3,236,244 | 2/1966 | Irby et al. | 131—10.9 |

FOREIGN PATENTS 652,716  11/1962  Canada.

OTHER REFERENCES

German printed application 1,077,127, Mar. 3, 1960.

LUCIE H. LAUDENSLAGER, *Primary Examiner.*